(12) United States Patent
Bach

(10) Patent No.: US 6,760,371 B1
(45) Date of Patent: Jul. 6, 2004

(54) METHOD AND APPARATUS IMPLEMENTATION OF A ZERO FORCING EQUALIZER

(75) Inventor: Susan E. Bach, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/533,018

(22) Filed: Mar. 22, 2000

(51) Int. Cl.[7] .............................. H03H 7/30; H03H 7/40; H03K 5/159
(52) U.S. Cl. .................... 375/232; 375/231; 708/323
(58) Field of Search ........................ 375/232, 230, 375/231, 233, 234, 235; 708/323, 322; 333/18, 28 R

(56) References Cited

U.S. PATENT DOCUMENTS

| | | | | |
|---|---|---|---|---|
| 4,575,857 A | * | 3/1986 | Murakami | .................. 375/230 |
| 4,695,969 A | * | 9/1987 | Sollenberger | ................ 708/323 |
| 4,799,180 A | * | 1/1989 | Suzuki | ....................... 708/323 |
| 5,089,892 A | * | 2/1992 | Koguchi et al. | ............ 348/614 |
| 5,130,799 A | * | 7/1992 | Iga et al. | ..................... 348/614 |

\* cited by examiner

Primary Examiner—Phoung Phu
(74) Attorney, Agent, or Firm—Terje Gudmestad

(57) ABSTRACT

An equalizing apparatus includes an equalizer which has a plurality of adjustable tap weights that equalizes a received signal based on values of the adjustable tap weights, a tap weight update calculation unit coupled to the equalizer and which determines tap weight updates for use in adjusting the tap weights during operation of the equalizer, an offset memory that stores one or more tap weight update offset values and a summer coupled to the tap weight update calculation unit and to the offset memory. The summer combines each of the tap weight updates with one of the tap weight update offset values to produce modified tap weight updates which, in turn, are provided to the equalizer to adjust the tap weights.

13 Claims, 3 Drawing Sheets

METHOD AND APPARATUS IMPLEMENTATION OF A ZERO FORCING EQUALIZER

This invention was made with Government support. The Government has certain rights in this invention.

FIELD OF THE INVENTION

The invention relates generally to communication signal equalizers and, more particularly, to zero forcing equalizers.

BACKGROUND OF THE INVENTION

The need to efficiently and reliably transmit and receive data at high speeds or data rates has long been known. In particular, there is a known need for multi-gigabit per second satellite links with bandwidth efficiencies of three bits per second per Hertz or greater at acceptable bit error rates. Unfortunately, there have been significant problems which have hindered the use of very high data transmission rates, including problems caused by channel distortions. In the past, equalization has been used to compensate for channel distortions introduced by band limiting atmospheric conditions and general non-ideal filtering, all of which cause intersymbol interference.

A transversal filter, e.g., a tapped delay line or nonrecursive equalizer, is one common type of equalizer which has been used to perform equalization in high data rate transmission systems. A transversal filter can be described as a tapped delay line where the output of each of a set of taps is passed through a gain, which may be adjustable, and is then summed with the other tap outputs to produce an equalized signal. In a zero forcing equalizer (ZFE), the gain of each tap output is adaptively determined by a zero forcing algorithm. In such a system, the current and time delayed values of a received signal are linearly weighted by equalizer coefficients (tap weights or gains) with the equalizer coefficients being chosen to force the signal at a feedback point (e.g., the output of the equalizer) to zero at all times other than the sampling time associated with the main path signal. At the sampling time associated with the main path signal, upon which decoding takes place, the output of the equalizer is forced to a normalized one.

FIG. 1 illustrates a known prior art transmission system, having a receiver/demodulator/decoder which uses a ZFE. In this system, a transmitter 10 converts a digital signal to, for example, symbols, modulates the symbols onto a carrier signal, using for example, a quadrature amplitude modulation (QAM) technique or any other digital modulation technique such as PSK, QPSK, etc., and transmits the modulated carrier signal through a channel 12 to a receiver/tapped delay equalizer 14. The tapped delay equalizer 14 uses tap weights to equalize the received signal and the equalized signal is then communicated to a demodulator 16 which converts the signal to baseband. An analog-to-digital (A/D) converter 18 converts the output of the demodulator 16 to a digital signal and, in most cases, separately converts the in-phase and quadrature components of the output of the demodulator 16 to digital signals. The output(s) of the A/D converter 18 are then communicated to a decision unit 20 which decodes the received symbols. In addition, the baseband signal from the demodulator 16 is communicated to a high resolution A/D converter 22 which produces a high resolution error signal. The output of the high resolution A/D converter 22 is communicated to a ZFE update calculation unit 23 which, in turn, uses the high resolution error signal to calculate tap weight updates for use in the equalizer 14.

The unit 23 communicates the tap weight updates to the tapped delay equalizer 14 which adds the tap weight updates to the tap weights within the equalizer 14. As is known, the ZFE update calculation unit 23 uses a zero forcing algorithm to calculate the correlation between the error in the main path signal, as output by the A/D converter 22, and delayed versions of that signal at a number of times delayed from the main signal path sampling time. The unit 23 uses these correlation values to determine tap weight adjustments which, when added to the tap weights within the tapped delay equalizer 14, causes the equalizer to effectively drive the signal at the feedback point 24 to zero at all sampling times except the sampling time associated with the main signal path (or the impulse response at the decision unit 20 is the same as sent by the transmitter 10). In this manner, the feedback path of the A/D converter 22 and the ZFE update calculation unit 23 automatically adapts the tap weights within the equalizer 14 to account for and negate distortions caused by changes in the channel, noise, etc., all of which can cause intersymbol interference.

While intersymbol interference can generally be corrected through equalization, current methods of equalization are relatively slow, inefficient and consume a lot of power. Furthermore, the traditional ZFE algorithm as used in the system of FIG. 1 often does not result in the best bit error rate (BER) because the common implementation of a ZFE algorithm adapts the tap weights within the tapped delay equalizer 14 to cancel intersymbol interference at the feedback point 24, not at the decision point, i.e., where symbol decoding is taking place. Thus, if, as is generally the case, the feedback point 24 is not at the end of the demodulation path, i.e., where symbol decoding is taking place, or if the feedback path itself introduces distortions, or if the tapped delay equalizer 14 has imperfections, the ZFE algorithm will not be able to adapt the tap weights in a manner that accounts for all of the distortions introduced by the elements (and only the elements) through which the signal being decoded passes. In addition, as a result of canceling intersymbol interference, noise is often added to the channel by the feedback loop. Thus, while a traditional ZFE cancels the intersymbol interference detected, this ZFE may still cause an increase in the BER over that possible.

For example, in the system of FIG. 1, the decision unit 20 performs symbol decoding on the output of the A/D converter 18 while the ZFE update calculation unit 23 makes equalizer tap weight adjustments based on the output of the A/D converter 22, which are different A/D converters. As a result, the transfer function of the A/D converter 18 is not taken into account in the ZFE update calculation unit 23 and, likewise, the transfer function of the A/D converter 22 is not taken into account by the decision unit 20, leading to a mismatch between the symbol decoding and equalizer functions. This, in turn, can lead to errors in symbol decoding and to an increased BER, which is undesirable.

SUMMARY OF THE INVENTION

An equalization system includes an equalizer which uses a set of tap weights to equalize a received signal, a ZFE update calculation unit which determines tap weight adjustments to drive the output of the equalizer to zero at sampling times other than sampling times associated with the main path signal and an offset device which adds offsets to the tap weight updates calculated by the ZFE update calculation unit before the tap weight updates are provided to the equalizer. The offsets stored in the offset device force the equalizer to equalize to some level of non-zero error, with the level of error being determined to provide a more robust equalizer that accounts for the transfer function of demodulation elements not in the feedback path of the equalizer or to provide a better BER.

According to one aspect of the invention, an equalizing apparatus equalizes a received signal. The equalizing apparatus includes an equalizer which has a plurality of adjustable tap weights that equalizes the received signal based on values of the adjustable tap weights, a tap weight update calculation unit that is coupled to the equalizer and that is adapted to determine tap weight updates for use in adjusting the tap weights during operation of the equalizer, an offset memory that stores one or more tap weight update offset values and a summer that is coupled to the tap weight update calculation unit and to the offset memory. The summer is combines each of the tap weight updates with one of the tap weight update offset values to produce modified tap weight updates which, in turn, are provided to the equalizer to adjust the tap weights. By adding an offset to the weight updates, known distortions after the feedback point can be included and accounted for by the equalizer and, likewise, distortions on the feedback path can be canceled out. These offsets can also compensate for imperfections in the transversal filter that prevent the transversal filter from reaching the ideal ZFE goal of zero intersymbol interference and/or can be used to achieve the best tradeoff between channel equalization and filtering of random noise.

According to another aspect of the invention, a method of controlling equalization of a received signal equalizes the received signal using an equalizer that includes a plurality of tap weights, uses an output of the equalizer to determine a set of tap weight updates and stores one or more tap weight update offset values. The method then combines the tap weight update offset values with the tap weight updates to produce a set of modified tap weight updates and uses the set of modified tap weight updates to adjust the plurality of tap weights used in equalizing the received signal.

According to yet another aspect of the invention, a method of determining a set of tap weight update offset values to be used in adjusting a set of tap weights within an equalizer first changes the tap weights within the equalizer. The method then transmits a known signal to the equalizer, decodes the transmitted known signal after the known signal has been passed through the equalizer and determines a bit error rate associated with the decoded known signal. The method changes the tap weights again, repeating this process, sends the known signal again and determines a new bit error rate, until the bit error rate meets a criterion. Next, the method selects one of the sets of tap weights based on the criterion, stores the selected one of the set of tap weights within the equalizer and again transmits the known signal to the equalizer. The method then uses a zero forcing algorithm to determine a set of tap weight updates based on the receipt of the known signal and uses the determined set of tap weight updates to produce the tap weight update offset values.

DESCRIPTION OF THE PREFERRED EMBODIMENTS

Figure 2:
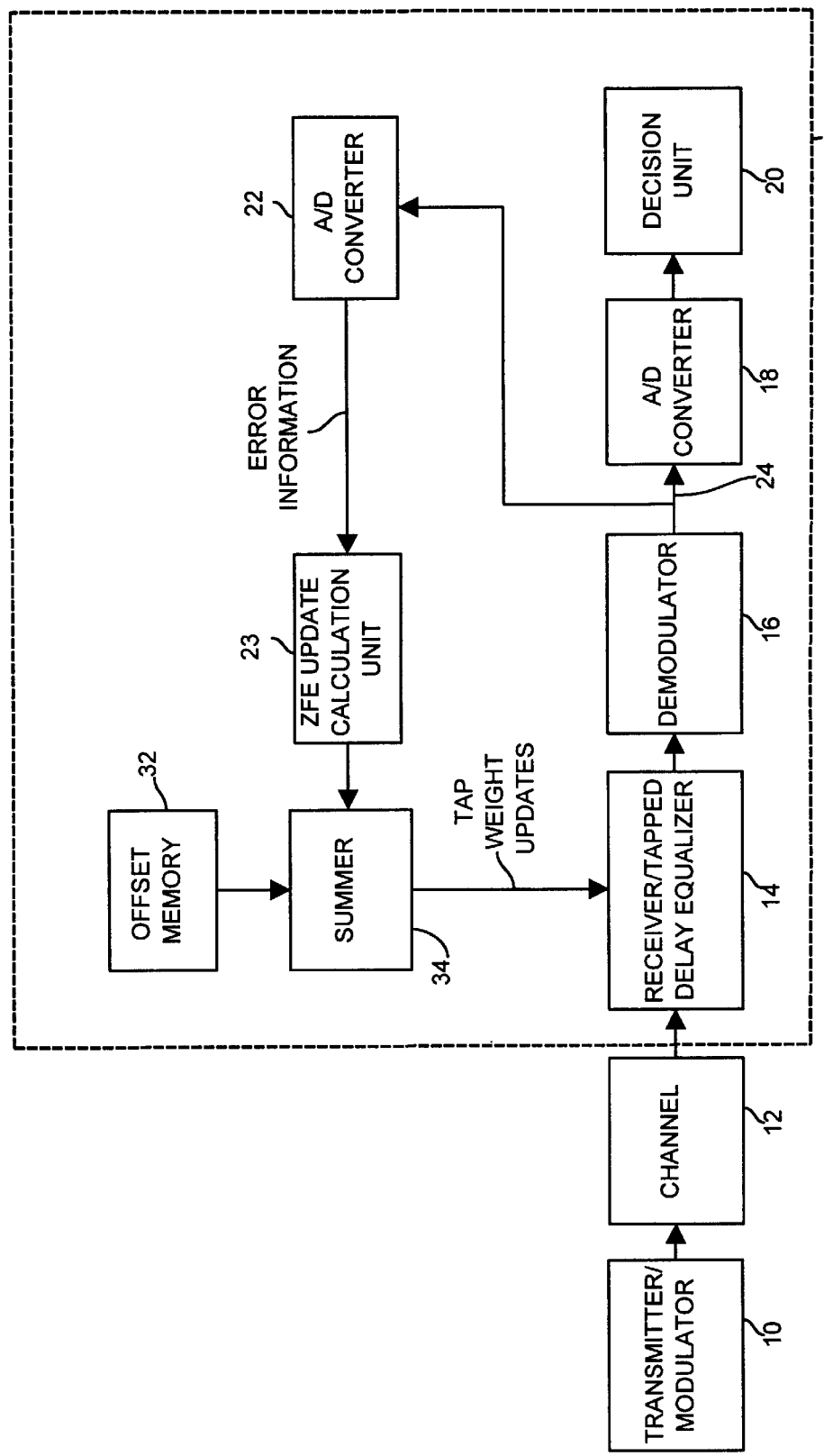
FIG. 2 is a block diagram of a communication system including a demodulator having a modified equalizer that adds offsets to the outputs of a ZFE update calculation unit.

Referring to FIG. 2, a communication system 30 having a receiver/demodulator/decoder 31 that uses an improved zero forcing equalizer (ZFE) is illustrated. While the following examples illustrate the use of a receiver/demodulator which uses a ZFE, persons of ordinary skill in the art will appreciate that the present invention is not limited to use with systems that use ZFEs. To the contrary, the concepts and devices disclosed herein may be used in any suitable equalizer that uses a feedback loop to adjust a set of equalizer tap weights. Furthermore, while the example equalizers described herein are used to demodulate a quadrature amplitude modulated (QAM) signal, these equalizers could, instead, be used to demodulate any other type of signal including any signal modulated according to any digital modulation technique, such as PSK, FSK, QPSK, PAM-VSB, OFDM, etc. or any desired or applicable analog modulation technique.

Figure 1:
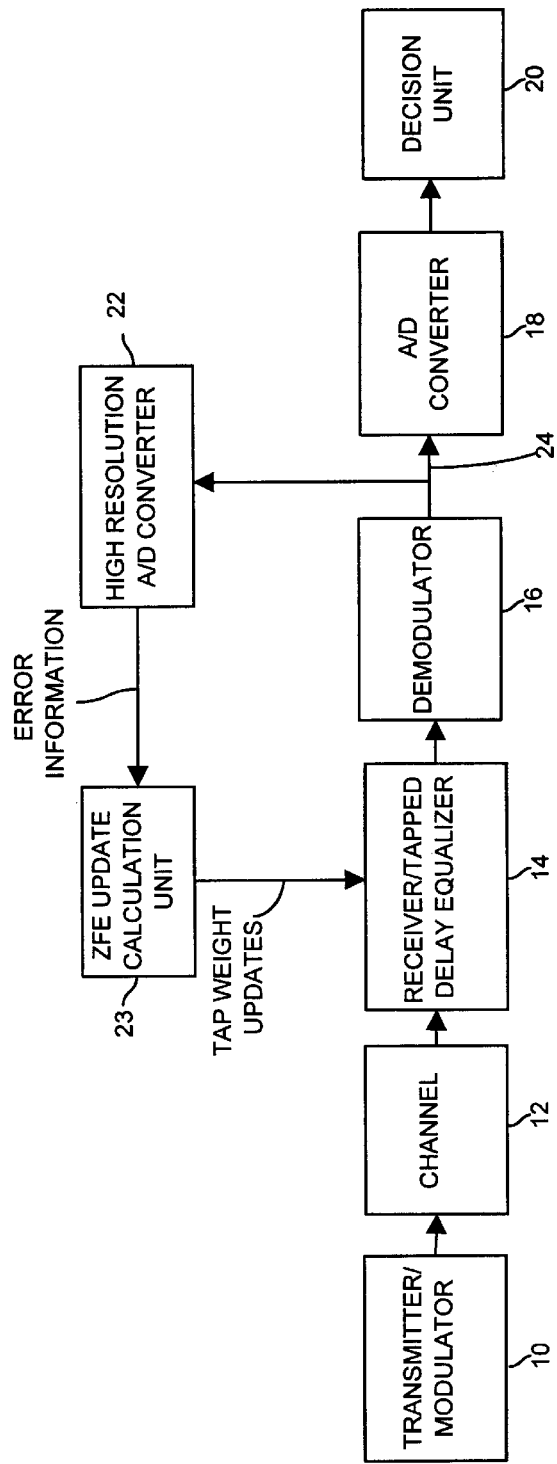
FIG. 1 is a block diagram of a prior art communication system including a receiver/demodulator/decoder using a known ZFE.

Generally speaking, the communication system of FIG. 2 is similar to that shown in FIG. 1 with like components being numbered the same as in FIG. 1. Thus, the improved receiver/demodulator/decoding system 31 includes a standard tapped delay equalizer 14 coupled to a demodulator 16, an A/D converter 18, and a decision unit 20. Likewise, a feedback path used to adaptively alter the tap weights in the tapped delay equalizer 14 includes a high resolution A/D converter 22 and a standard ZFE update calculation unit 23 which operates substantially identically to the units now being used in traditional zero forcing equalizing systems. However, as illustrated in FIG. 2, an offset memory 32 is coupled to a summer 34 which, in turn, is connected to the output of the ZFE update calculation unit 23. The offset memory 32 stores a set of offsets which are added to the tap weight updates produced by the ZFE update calculation unit 23 before these updates are delivered to the tapped delay equalizer 14. More particularly, the offset memory 32 stores ZFE equalizer offset values and adds these values (which can be positive or negative or zero) to every tap weight update produced by the traditional ZFE algorithm. In some cases, the offset values are fixed and, in other cases, the offset values are re-calculated periodically. As will be explained with respect to FIG. 3, the tap weight update offsets may be set to produce a fixed average correlation between the error in the main path signal within the equalizer 14 and the signal associated with sampling times delayed from the main signal at the feedback point 24.

As will be understood, the addition of offset values to the tap weight updates, which typically range from 0 to 0.2 but could range from 0 to 1, provided by the ZFE update calculation unit 23 changes the minimization criteria of the ZFE from zero intersymbol interference at the feedback point 24 to a predetermined amount. Thus, instead of driving the output of the tapped delay equalizer 14 to zero at all times except the times associated with the sampling of the main path signal, as in a traditional ZFE, the tap weights within the equalizer 14 are adjusted to drive the output of the tapped delay equalizer 14 to some non-zero level at times delayed from the sampling time of the main path signal to thereby account for (and to minimize) distortions resulting from effects not taken into account by the feedback path of the ZFE, such as the transfer function of the A/D converter 18 in FIG. 2. In other words, distortions resulting from system components after the feedback point 24 as well as other distortions and noise introduced by the receiver/demodulator/decoder 31 may be reduced by accounting for these distortions in the form of the offsets added to the tap weight updates communicated from the ZFE update calculation unit 23. The addition of the offsets to the output of the ZFE update calculation unit 23 results in improved flexibility in the tapped delay equalizer 14, improved equalization and a better BER at the output of the decision unit 20 because the introduced offsets can compensate for imperfections in the transversal filter (i.e., the equalizer 14) that prevent the equalizer 14 from reaching the ideal ZFE goal of zero intersymbol interference and/or achieve the best tradeoff between equalization and the filtering of random noise at the decision point 20.

Generally speaking, the difference between the standard ZFE and the modified ZFE described herein can be expressed in the following mathematical formulae. First, as is known, the tap weights in a standard or traditional ZFE are generally determined according to the equation:

$$W_{n,new} = W_{n,old} + \mu(\epsilon I^*_n) \quad (1)$$

wherein:

$W_{n,new/old}$ = the equalizer tap weights (new or old);
$n$ = the tap number;
$\mu$ = the scaling and/or phase shift;
$\epsilon$ = the error value at the feedback point; and
$I^*_n$ = the complex conjugate of the symbol corresponding to the tap being updated.

Thus, previous ZFE implementations update the weights of the transversal filter strictly to zero-out intersymbol interference and, thus, the weights in the equalizer converge (or stop changing) when $<\epsilon I^*_n>$ equals zero (wherein the function $<>$ denotes a time average).

However, the tap weights in the unit described herein are adjusted according to the equation:

$$W_{n,new} = W_{n,old} - \mu(\epsilon I^*_n) - \mu m_n \quad (2)$$

wherein:

$m_n$ = the desired offset.

The equalizer system of FIG. 2 differs by using the offsets $m_n$ to cause the weights to converge to a different value than that associated with zero intersymbol interference at the feedback point. Instead, the weights converge when $<\epsilon I^*_n>$ equals $m_n$. The inclusion of the offset in the tap weight update can be performed before or after scaling and/or phase shifting of the tap weight update occurs, as long as the same operations are or have been applied to the desired offset as to the traditional tap weight update.

Thus, the implementation of the ZFE algorithm described herein is different than the traditional approach to ZFE in that a constant additive adjustment is made to every update of every tap weight value in the transversal filter. This offset changes the minimization criteria of the algorithm from zero intersymbol interference to a predetermined amount of intersymbol interference. Such a modification to ZFE adds more flexibility as to placement of the feedback point of the equalizer, compensates for imperfections in the feedback path and the equalizer itself, and improves overall performance, especially in channels with nonlinearities where zero intersymbol interference does not produce the best bit error rate.

One particular advantage of the system described herein is that this equalizer can be used with any adaptive equalizer that applies the traditional ZFE algorithm with only minor hardware or software changes. In fact, current modem designs typically apply traditional ZFE, despite its disadvantages, due to the speed of convergence of the weights and the ease of implementation compared to other algorithms that obtain better performance. The modified version of ZFE described herein maintains the advantages of traditional ZFE and performs as well as other algorithms with only minor changes to the hardware or software implementation of these systems.

While the tap weight offset values are illustrated as being added to the output of the update calculation unit 23, the update calculation unit 23 could, instead, store the offset(s) and solve the traditional zero forcing algorithm to a non-zero value, i.e., to the value(s) specified by the offset value(s), instead of to zero, as is done traditionally. This method is considered to be the substantially the same as adding the offset value(s) to the outputs of the update calculation unit 23. In fact, in this case, the summation between the offset values and the tap weight updates is performed within the update calculation unit when implementing the zero forcing algorithm, instead of immediately after operation of that unit.

The offset values added to the tap weight updates in FIG. 2 can be determined in any manner but, preferably, are adjusted to account for the transfer function of circuit elements not within the feedback path of the tapped delay equalizer 14, to account for noise or distortions introduced by the feedback path or to minimize BER at the decision circuit 20. In one embodiment, the distortions beyond the feedback point 24 can be determined or quantified through previous experience or experimentation with a particular circuit and the appropriate offsets to correct for the distortions introduced by these known circuit elements can be stored in the offset memory 32 to thereby adjust for the quantified distortions. Of course, the distortion caused by the elements in the system 31 and the corresponding offsets may be determined by modeling the system 31 in modeling software, such as the modeling software sold under the name Wonder, and then calculating the necessary offsets to take into account distortions introduced by the modeled system elements.

Figure 3:
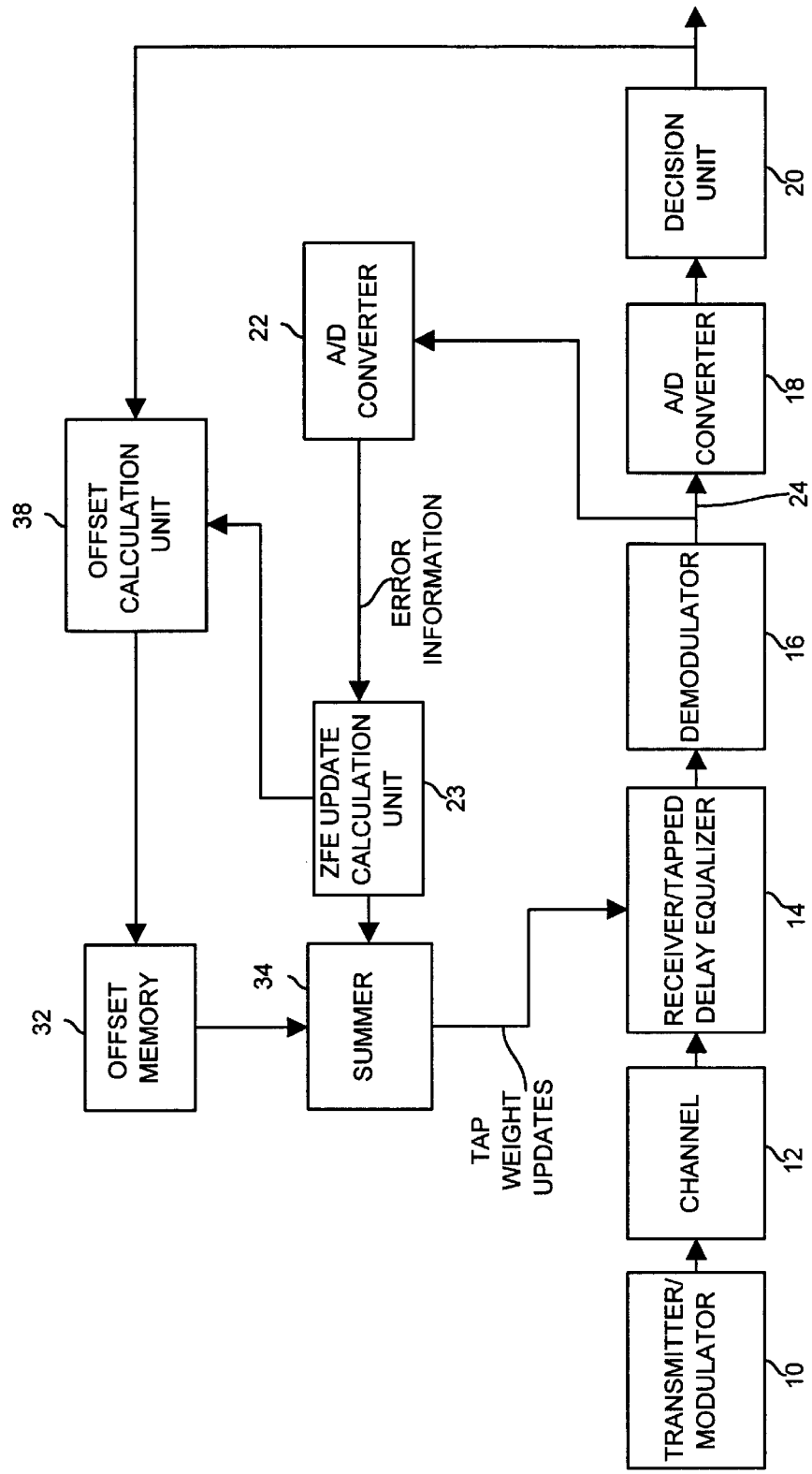
FIG. 3 is block diagram of the communication system of FIG. 2 including elements for determining tap weight update offsets.

In another embodiment, the equalizer weight offsets are determined in a manner which is adapted to reduce BER. Referring to FIG. 3, a set of tap weights for the equalizer 14 is determined and is stored in the equalizer 14. Next, a known signal is transmitted through the channel and the receiver/demodulator 31. An offset calculation unit 38 compares the output of the decision unit 20 to a stored version of the known signal held in a signal storage memory and, using bit error rate calculation programming stored in a programming memory, determines the BER associated with the set of tap weights being used. Of course, the BER may be determined using any a known signal of any suitable or desired length. The error calculation unit 38 then dithers the tap weights within the equalizer 14 and the process of sending the known signal and determining a BER associated with the new set of tap weights is repeated. The offset calculation unit 38, which may be implemented any suitable hardware or software run on a processor, may use any desired dithering technique or dithering programming to dither the tap weights including, for example, dithering the tap weights a predetermined number of times or until a BER below a predetermined threshold results, or until any other desired criterion or criteria is met. During the dithering, the A/D converter 22 and ZFE update calculation unit 23 are not in operation. The dithered tap weights may be, for example, stored in the offset memory 32 and may be communicated to the summer 34 and then to the tapped delay equalizer 14. Of course, the offset calculation unit 38 may deliver the new tap weights directly to the tapped delay equalizer 14 if desired or cause dithering in any other suitable manner.

After the completion of the dithering and the BER calculation steps, the offset calculation unit 38 then selects the set of tap weights that produced, for example, the lowest BER and stores these tap weights in the tapped delay equalizer 14. The known signal is then again sent and, this time, the ZFE update calculation unit 23 determines the correlation between main path errors and delayed time versions of the main path signal, as is standard operation of a ZFE. These correlation values, however, are provided to the offset calculation unit 38 and are used to produce the offset values which are stored in the offset memory 32. Generally speaking, these correlation values describe the average correlation error at the feedback point 24 that achieves the best bit error rate in the decoder 20. As previously described, the offsets, which are calculated to produce the average correlation error at the feedback point 24, are added to each of the tap weight updates during normal operation of the system 31 to correct for the distortions not seen by the traditional equalizer feedback loop as well as other distortions or irregularities not corrected by a traditional ZFE.

Of course, any other method of selecting the offset values to be used to cause the ZFE within the system 31 to converge to tap weights which produce non-zero intersymbol interference at the feedback point 24 can be used as well, including, for example, standard trial and error methods. Still further, the components illustrated in FIGS. 2 and 3 can be implemented in any suitable hardware or, if desired, can be implemented in software run in a processor of any suitable nature. For example, the ZFE update calculation unit 23, the summer 34 and offset calculation unit 38 may be implemented by any suitable programming stored in any memory and executed in any suitable processor device, such an in a microprocessor, an ASIC, or any other firmware, hardware or software device. Likewise, this software, as well as the offset values, may be stored in any desired memory, such as in a ROM, a RAM, an ASIC or other memory.

Numerous modifications and alternative embodiments of the invention will be apparent to those skilled in the art in view of the foregoing description. Accordingly, this description is to be construed as illustrative only and is not to be limiting of the invention. Thus, the details of the structure and method may be varied substantially without departing from the spirit of the invention and the exclusive use of all modifications which are within the scope of the appended claims is reserved.

What is claimed is:

1. An equalizing apparatus for use in equalizing a received signal, comprising:
   an equalizer including a plurality of adjustable tap weights that equalizes the received signal based on values of the adjustable tap weights;
   a tap weight update calculation unit coupled to the equalizer and adapted to determine tap weight updates for use in adjusting the tap weights during operation of the equalizer;
   an offset memory that stores one or more tap weight update offset values;
   a summer coupled to the tap weight update calculation unit and to the offset memory, wherein the summer is adapted to combine each of the tap weight updates with one of the tap weight update offset values to produce a modified tap weight update and wherein the summer is coupled to the equalizer to provide the modified tap weight updates to the equalizer to adjust the tap weights;
   a demodulator coupled to the equalizer, wherein the demodulator produces a demodulated signal, and wherein the tap weight update calculation unit is coupled to the equalizer through the demodulator; and
   a decision unit coupled to the demodulator which decodes the demodulated signal.

2. The equalizing apparatus of claim 1, further including an analog-to-digital converter coupled between the demodulator and the decision unit.

3. The equalizing apparatus of claim 1, further including an analog-to-digital converter coupled between the tap weight update calculation unit and the demodulator.

4. An equalizing apparatus for use in equalizing a received signal, comprising:
   an equalizer including a plurality of adjustable tap weights that equalizes the received signal based on values of the adjustable tap weights;
   a tap weight update calculation unit coupled to the equalizer and adapted to determine tap weight updates for use in adjusting the tap weights during operation of the equalizer;
   an offset memory that stores one or more tap weight update offset values;
   a summer coupled to the tap weight update calculation unit and to the offset memory, wherein the summer is adapted to combine each of the tap weight updates with one of the tap weight update offset values to produce a modified tap weight update and wherein the summer is coupled to the equalizer to provide the modified tap weight updates to the equalizer to adjust the tap weights; and
   a decision unit coupled to the equalizer to decode an output of the equalizer to produce a decoded signal and an offset calculation unit coupled to the decision unit and the offset memory, wherein the offset calculation unit includes first programming stored in a programming memory which, when run on a processor, is adapted to compute the one or more tap weight update offset values and to store the one or more tap weight update offset values in the offset memory.

5. The equalizing apparatus of claim 4, wherein the offset calculation unit includes dithering programming which is adapted to dither the tap weights within the equalizer.

6. The equalizing apparatus of claim 4, wherein the offset calculation unit includes bit error rate calculation programming which is stored in the programming memory and is adapted to calculate a bit error rate associated with the decoded signal.

7. The equalizing apparatus of claim 6, wherein the offset calculation unit includes a signal storage memory adapted to store a known signal to be used by the bit error rate calculation programming to calculate the bit error rate associated with the decoded signal.

8. The equalization apparatus of claim 4, wherein the offset calculation unit is further coupled to the tap weight update calculation unit and uses a set of tap weight updates produced the by tap weight update calculation unit to produce the one or more tap weight update offset values.

9. An equalizing apparatus for use in equalizing a received signal, comprising:
   an equalizer including a plurality of adjustable tap weights that equalizes the received signal based on values of the tap weights;

a demodulator coupled to the equalizer to produce a demodulated signal;

a zero forcing tap weight update calculation unit coupled to the demodulator and adapted to determine tap weight updates from the demodulated signal for use in adjusting the tap weights during operation of the equalizer, wherein the zero forcing tap weight update calculation unit uses a zero forcing algorithm to calculate the tap weight updates;

an offset memory that stores one or more tap weight update offset values;

a summer coupled to the tap weight update calculation unit and to the offset memory, wherein the summer is adapted to combine each of the tap weight updates with one of the tap weight update offset values to produce a modified tap weight update and wherein the summer is coupled to the equalizer to provide the modified tap weight updates to the equalizer to adjust the tap weights; and a decision unit coupled to the demodulator which decodes the demodulated signal and an offset calculation unit coupled to the decision unit and the offset memory, wherein the offset calculation unit includes first programming stored in a programming memory which, when run on a processor, is adapted to compute the one or more tap weight update offset values and to store the one or more tap weight update offset values in the offset memory.

10. A method of controlling the equalization of a received signal, comprising the steps of:

equalizing the received signal using an equalizer that includes a plurality of tap weights;

using an output of the equalizer to determine a set of tap weight updates;

storing one or more tap weight update offset values;

combining the tap weight update offset values with the tap weight updates to produce a set of modified tap weight updates;

using the set of modified tap weight updates to adjust the plurality of tap weights used in the step of equalizing; and determining the tap weight update offset values including the steps of;

(a) setting the tap weights within the equalizer;

(b) transmitting a known signal to the equalizer;

(c) decoding the transmitted known signal after the known signal has been passed through the equalizer;

(d) determining a bit error rate associated with the decoded known signal;

(e) dithering the tap weights within the equalizer; and (f) repeating steps (b) through (d).

11. The method of controlling the equalization of a received signal of claim 10, further including the steps of selecting one of the sets of tap weights based on the determined bit error rates, storing the selected one of the set of tap weights within the equalizer, again transmitting the known signal to the equalizer, using a zero forcing algorithm to determine a set of tap weight updates and using the determined set of tap weight updates to produce the tap weight update offset values.

12. A method of determining a set of tap weight update offset values to be used in adjusting a set of tap weights within an equalizer, comprising the steps of:

(a) changing the tap weights within the equalizer;

(b) transmitting a known signal to the equalizer;

(c) decoding the transmitted known signal after the known signal has been passed through the equalizer;

(d) determining a bit error rate associated with the decoded known signal;

(e) repeating steps (b) through (d) until a criterion is met;

(f) selecting one of the sets of tap weights based on the criterion;

(g) storing the selected one of the set of tap weights within the equalizer;

(h) again transmitting the known signal to the equalizer;

(i) using a zero forcing algorithm to determine a set of tap weight updates; and (j) using the determined set of tap weight updates to produce the tap weight update offset values.

13. The method of determining a set of tap weight update offset values of claim 12, wherein the criterion is based on the bit error rate determined in step (d).

* * * * *